United States Patent [19]

Shiomi et al.

[11] Patent Number: 4,547,955
[45] Date of Patent: Oct. 22, 1985

[54] AUTOMATIC TOOL EXCHANGING SYSTEM

[75] Inventors: Tadataka Shiomi; Kouichi Nabika, both of Gifu; Takashi Kawagoe, Shiga, all of Japan

[73] Assignee: Murata Kikai Kabushiki Kaisha, Japan

[21] Appl. No.: 380,814

[22] Filed: May 21, 1982

[30] Foreign Application Priority Data

May 24, 1981 [JP] Japan ................. 56-79008

[51] Int. Cl.⁴ ............................ B23Q 3/157
[52] U.S. Cl. ..................... 29/568; 29/33 P; 29/563
[58] Field of Search ............ 29/568, 33 P, 563, 26 A

[56] References Cited

U.S. PATENT DOCUMENTS

| | | | |
|---|---|---|---|
| 3,466,740 | 9/1969 | Harman | 29/568 |
| 3,524,248 | 8/1970 | Durr et al. | 29/568 |
| 3,576,540 | 4/1971 | Fair | 29/563 X |
| 3,781,974 | 1/1974 | Holzl et al. | 29/568 |
| 4,240,194 | 12/1980 | Inami et al. | 29/568 |

FOREIGN PATENT DOCUMENTS

1249631 10/1971 United Kingdom ........ 29/568

Primary Examiner—Z. R. Bilinsky
Attorney, Agent, or Firm—Spensley, Horn, Jubas & Lubitz

[57] ABSTRACT

Herein disclosed is an automatic tool exchanging system for an NC machining tool, in which a tool column stored with tools to be fed to the spindle head of the NC machining tool is adapted to move in accordance with the movement of the spindle head. The tools are transferred between a tool magazine and the tool column while the spindle head continues its machining operation.

8 Claims, 9 Drawing Figures

AUTOMATIC TOOL EXCHANGING SYSTEM

BACKGROUND OF THE INVENTION

1. Field of the Invention

The present invention relates to a tool exchanging system for an NC machining tool and, more particularly, contemplates to improve the efficiency of the tool exchange thereby to shorten the standby time of the machining tool.

2. Description of the Prior Art

Before entering into the detailed description of the present invention, cursory review of the prior art will be made with reference to FIG. 1 in the accompanying drawings.

A machining tool 1 to which the present invention is to be applied is of the type, in which a workpiece W placed on a table 2 is machined by means of a tool T clamped by a spindle head S and in which the spindle head S is moved in various direction in accordance with the movement of the tool T. Machining tools provided with a tool storage magazine are disclosed in U.S. Pat. Nos. 3,998,338 and 4,238,034. On the other hand, the NC machining tool 1 has its body 3 equipped with a tool column 4, which is stored in advance with tools to be exchanged, so that the tools are exchanged between the column 4 and the spindle head S by the action of a tool exchanging robot 5 attached to the body 3. As a result, the column 4 has its tool exchanging position 6 fixed relative to the body 3. Therefore, the column 4 is moved in accordance with the movement of the spindle head S. On the other hand, the feed of that column 4 with the tools is conducted by carrying a tool magazine M, which is set in advance with a plurality of tools, on a transfer truck to the back of the machining tool 1. If the column 4 is moved during the machining operation, as has been described in the above, the tool exchange between the fixed tool magazine M and the column 4 is impossible. According to the prior art, therefore, the tool exchange is carried out by selecting the timing, at which the spindle head is stopped, such as the workpiece exchanging operation. In recent years, however, the workpiece exchange is advanced in automation so that the time therefore is remarkably shortened, whereas it takes much time to exchange many tools. As a result, the spindle head cannot be moved exclusively for the tool exchange to invite a disadvantage that the machining efficiency is deteriorated.

SUMMARY OF THE INVENTION

It is, therefore, an object of the present invention to eliminate the aforementioned disadvantage.

Another but major object of the object of the present invention is to provide a system for transferring tools between a tool magazine and a tool column during the machining operation of a spindle head.

According to a feature of the present invention, there is provided an automatic tool exchanging system for use in a tool exchanging system for an NC machining tool, in which a tool column stored with tools to be fed to the spindle head of said NC machining tool is adapted to move in accordance with the movement of said spindle head, said automatic tool exchanging system being characterized in that the tools are transferred between a tool magazine and said tool column while said spindle head continues its machining operation.

BRIEF DESCRIPTION OF THE DRAWINGS

Other objects and advantages of the present invention will become apparent from the following description taken in conjunction with embodiments with reference to the accompanying drawings, in which.

DESCRIPTION OF THE PREFERRED EMBODIMENTS

Figure 1:
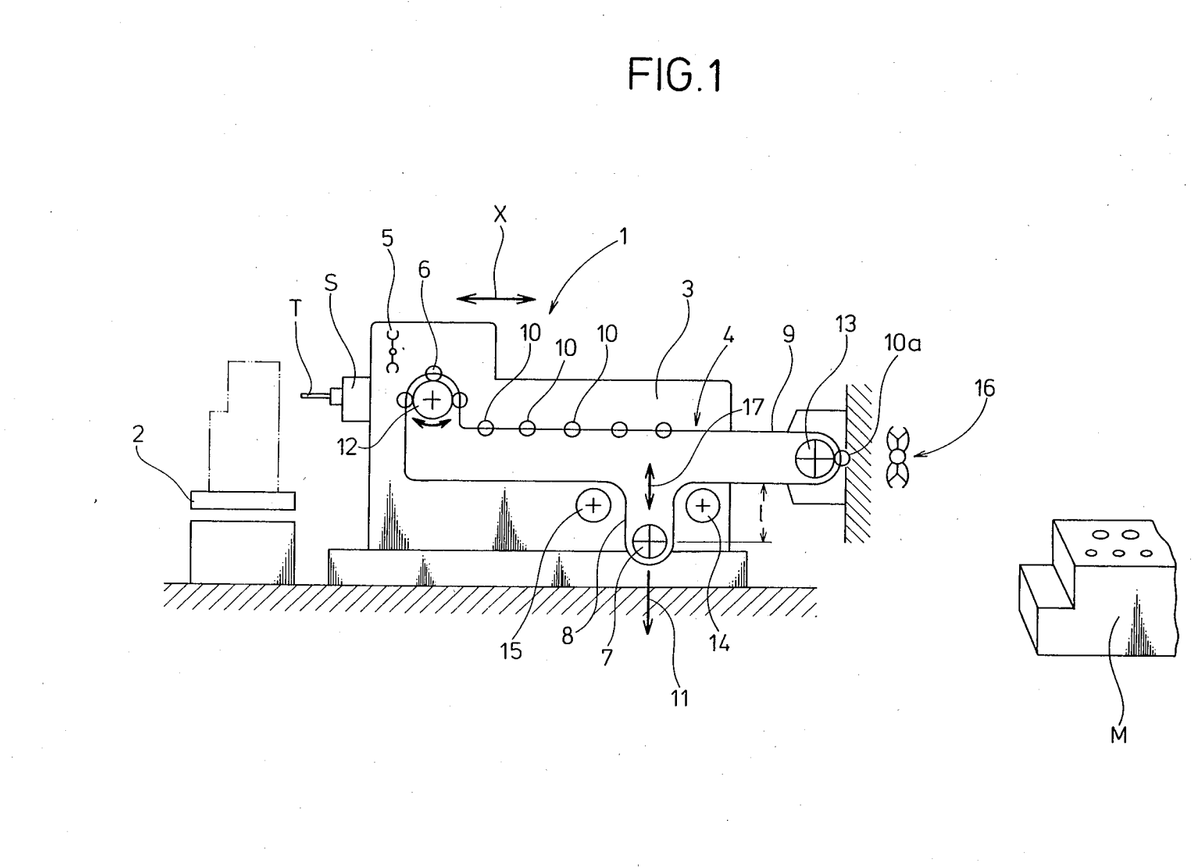
FIGS. 1 to 3 are side elevations showing machining tools to be used in tool exchanging systems according to first to third embodiments of the present invention.

A first embodiment of the present invention shown in FIG. 1 corresponds to the case in which the column 4 has such a slack portion 8 having a length l as is tensiled by an idler pulley 7. The column 4 is constructed to have its roller chain 9 carrying a plurality of tool boxes 10 at an equal pitch so that it can be freely slackened by means of a suitable pulley or sprocket. In the case as shown, the tool column 4 is made to run under tension upon pulleys 12, 13, 14 and 15 while being formed with the slack portion 8 by the idler pulley 7 which is elastically biased at all times in the direction of arrow 11. The rearmost pulley 13 supporting the tool column 4 is made rotatable on a pivot pin which is anchored at the floor, and a tool box 10a having come to the leading end portion of the rearmost pulley 13 is located at a tool exchanging position, in which the tools are exchanged between the tool magazine M on the ground and the column 4 and which is fixed relative to the ground. Reference numeral 16 indicates a tool exchanging robot which is placed on the ground for exchanging the tools between the column 4 and the tool magazine M. In this case, the tool exchanging robot 16 is anchored at the ground.

As a result, if the body 3 is moved together with the spindle head S in the directions of arrows X for the machining operations while the tools are being exchanged between the column 4 and the tool magazine M, i.e., when the tool box 10a is fixed, the tension of the column 4 is to fluctuate, but the idler pulley 7 is moved in the directions of arrows 17 in accordance with those fluctuations so that the column 4 is prevented from being slackened or tensiled to be broken.

Figure 2:
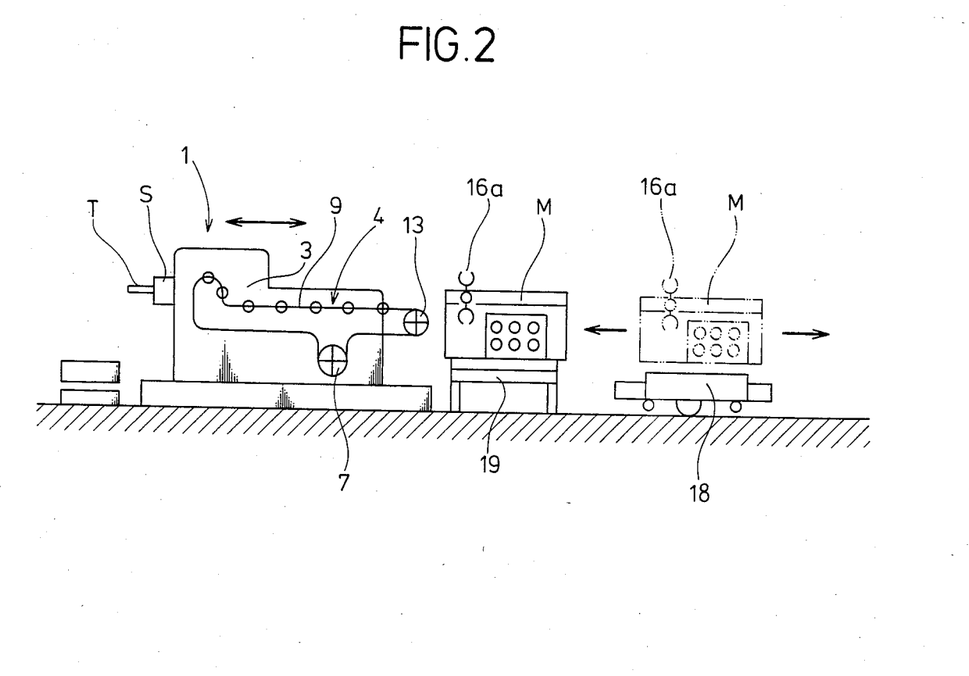

In a second embodiment shown in FIG. 2, a tool exchanging robot 16a is attached to the tool magazine M so that it is carried on an unmanned transfer truck 18 together with the tool magazine M. In this case, the positions of the tool magazine M and the tool exchanging robot 16a are precisely predetermined so that the centering operation when a platform 19 is to be loaded with the magazine M or vice versa is facilitated.

Figure 3:
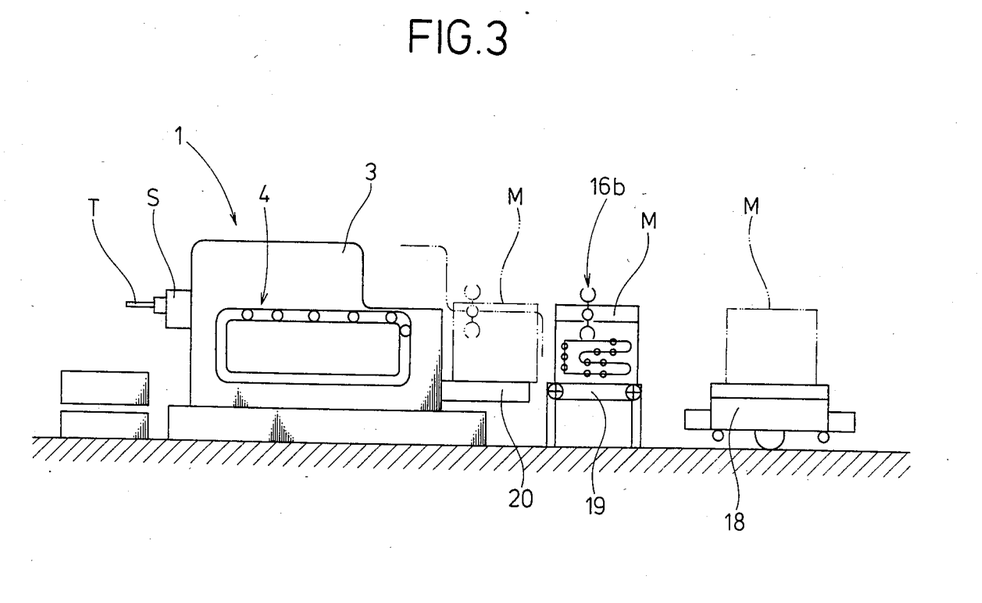

In a third embodiment shown in FIG. 3, the tool magazine M set with a tool exchanging robot 16b is transferred from the platform 19 to a unit loading station 20 at the side of the machining tool body 3 so that it is carried on the station 20 together with the body 3. Thus, the third embodiment does not require the idler pulley or the like for tensiling the column, as is different from the foregoing first and second embodiments, and is enabled to effect the tool exchange between the magazine and the column while the body is being moved in any direction. In the third embodiment being described, the tool exchanging robot 16b may be disposed at the side of the body.

In all of the foregoing embodiments, after the tool magazine M has been placed on the platform 19, the unmanned transfer truck 18 can be engaged in transfer of another magazine or workpiece so that it can take care of a plurality of machining tools. The tool exchanging robot set on the ground or the tool magazine is made coactive with the NC machining tool upon reception and delivery of signals from and to a computer so that it exchanges tools as desired. It is quite natural that the tool exchange be effected upon or before a product lot switching operation, and the worn or troubled tools are exchanged by the system of the present invention.

In the embodiments thus far described, the constructions of the tool column and the tool magazine are deviced to achieve an efficient automatic exchange of tools. However, this purpose can also be achieved by sharing the time for the machining process.

Figure 4:
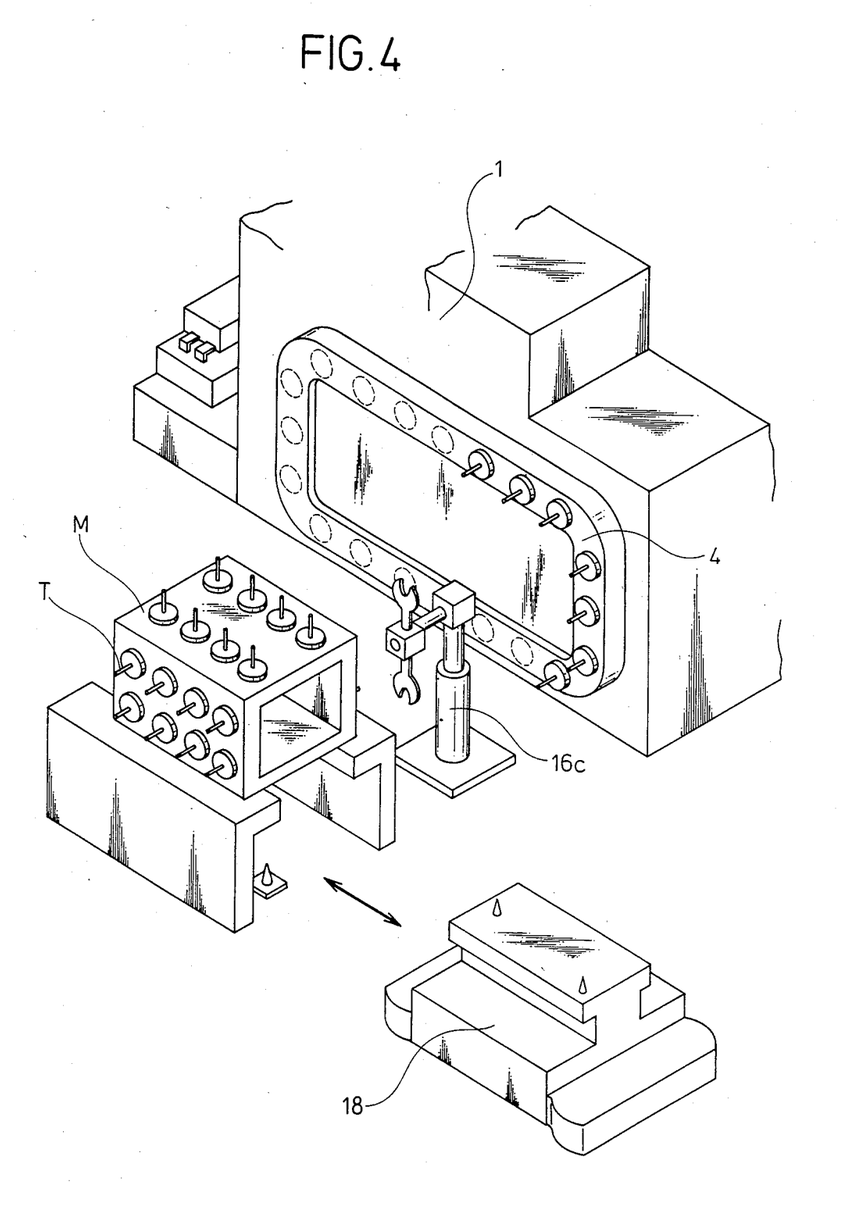
FIG. 4 is a perspective view showing an automatic exchanger which can be used with a system for exchanging tools at the most proper time selected during the machining process.
Figure 5:
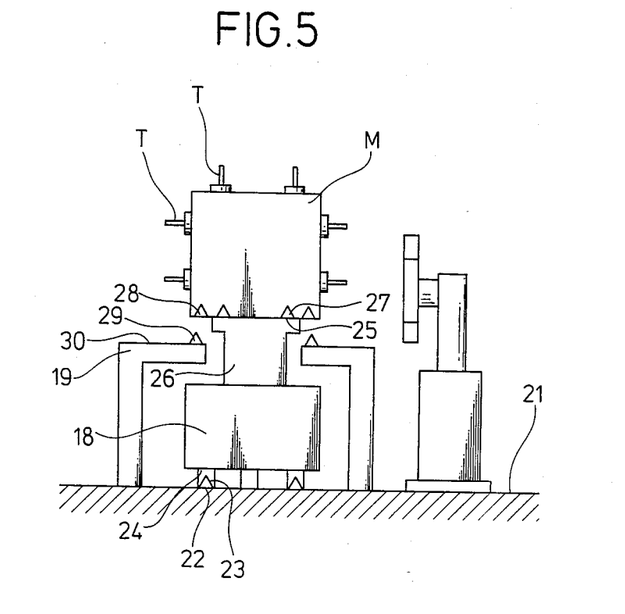
FIG. 5 is a side elevation showing the same automatic exchanger.
Figure 6:
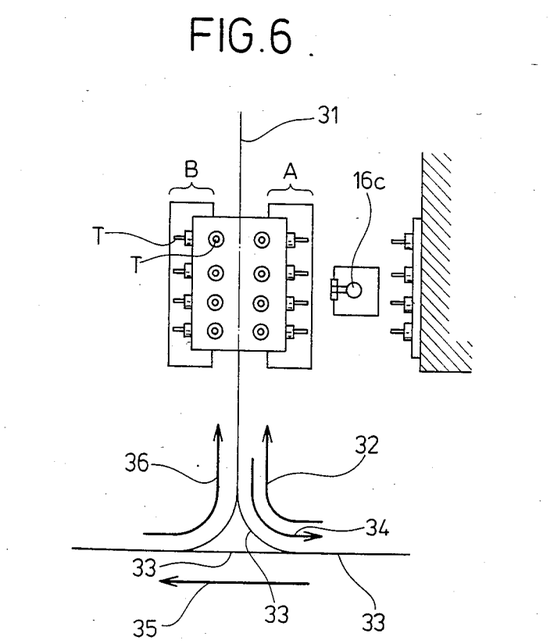
FIG. 6 is a top plan view of a tool magazine or the like and shows the switchback of a transfer truck.

In this case, as shown in FIG. 4, a tool exchanging robot 16c may be disposed at the side of the tool column 4 of the machining tool 1 so that the tools T fitted in the tool magazine M may be transferred to the column 4. Likewise the cases of the foregoing first to third embodiments, the positioning of the unmanned transfer truck 18 relative to the floor is effected by forcing the pistons 24, which are anchored at the transfer truck 18 and which are formed with conical holes 23, into engagement with the conical projections 22 which are anchored in position at a floor 21, and the positioning of the tool magazine M relative to the transfer truck 18 is effected by forcing the conical projections 27, which are formed on the upper surface of a lift 26 of the transfer truck 18, into engagement with the conical holes 25 which are formed in the bottom surface of the tool magazine M. Likewise, the positioning between the platform 19 and the tool magazine M is effected by forcing the conical projections 29, which are formed on the receiving surface 30 of the platform 19, into engagement with the conical holes 28 which are formed in the bottom surface of the tool magazine M. In any case, the state out of position is corrected by the wedge actions of the conical projections relative to the conical holes. The tools in the magazine are arranged at the righthand side A and lefthand side B with respect to a center line 31, and the exchanging robot 16c is allowed to extract the tools only at either side. Therefore, the magazine M is switched back by means of the transfer truck 18 so that its position is changed. Specifically, the transfer truck at a vacant state is first guided along an arrow 32 by a guide line 33 to go to below the platform 19 thereby to lift the tool magazine M. Then, the transfer truck is moved back in the direction of arrow 34 together while carrying the tool magazine thereon. After that, the transfer truck is guided forward in the direction of arrow 35 and backward in the direction of arrow 36. Thus, the transfer truck turns to go to below the platform 19 thereby to unload the tool magazine M onto the platform. In these ways, the magazine M is set in a reversed direction.

Figure 7:
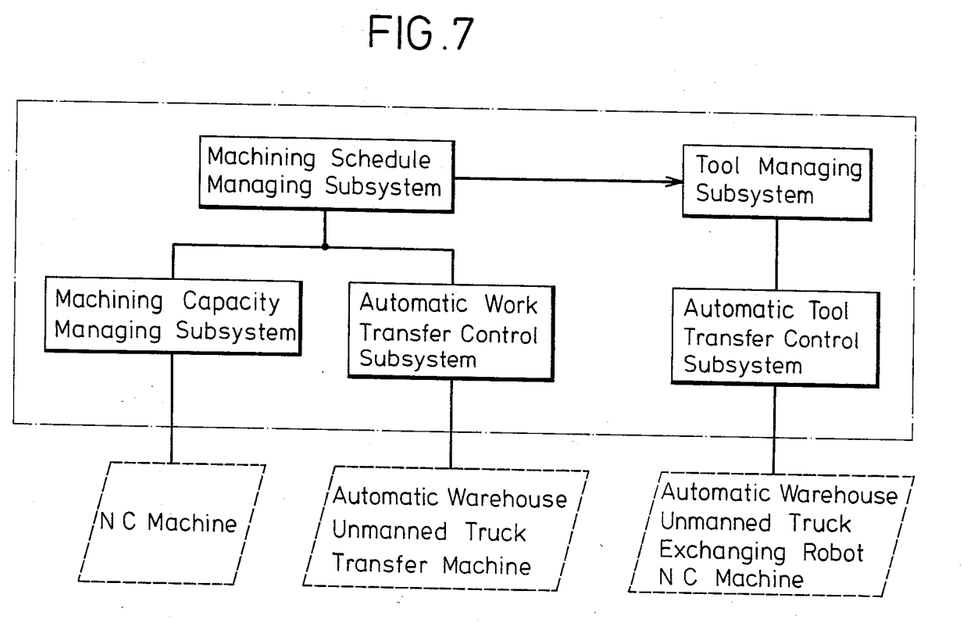
FIG. 7 is a block diagram showing the summary of the program of another system.
Figure 8:
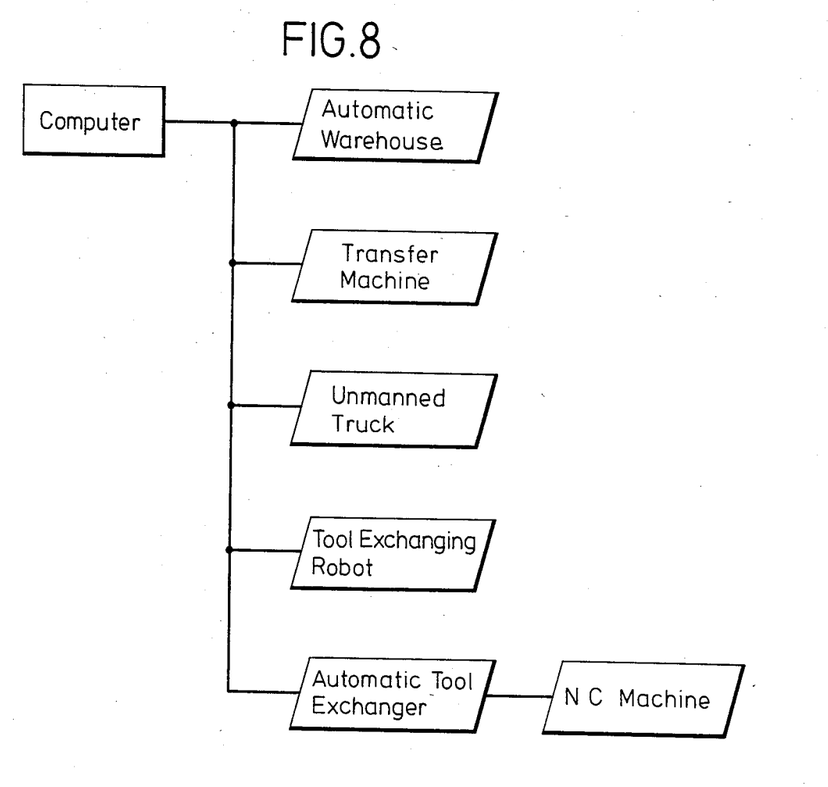
FIG. 8 is a block diagram showing the construction arrangement of the corresponding system.
Figure 9:
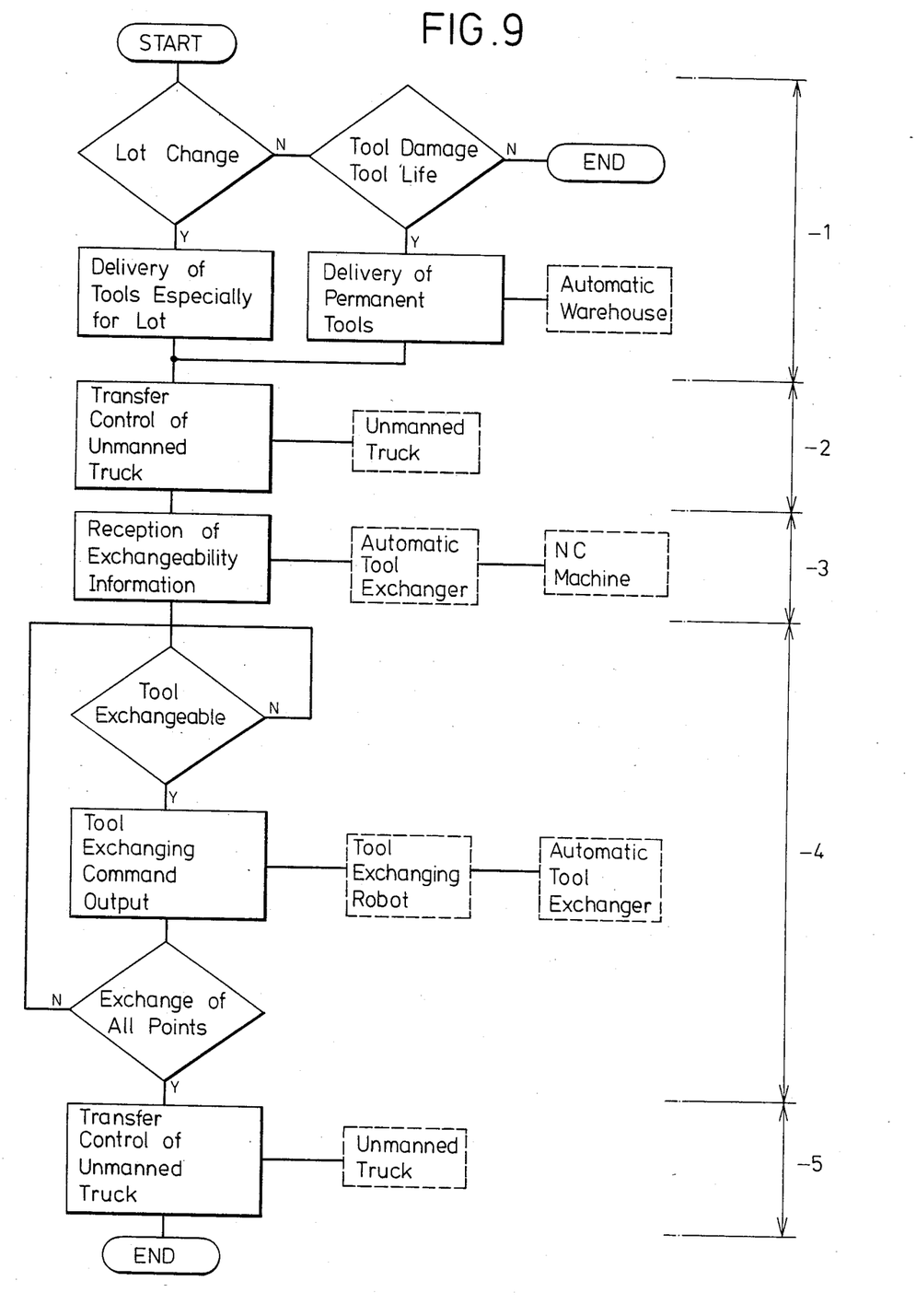
FIG. 9 is a flow chart showing a series of the aforementioned program.

The time sharing operation of the machining process is conducted by the following procedures. FIG. 7 shows the outline of the program of the automatic tool exchanging system. FIG. 8 is a block diagram showing the construction arrangement of the corresponding devices. FIG. 9 is a flow chart showing a series of the aforementioned program.

The automatic tool exchanging system is controlled by a machining schedule managing subsystem, which is the main program, and is made coactive with a machining capacity managing subsystem controlling the operation of the NC machine and with an automatic workpiece transfer control subsystem relating to the operations of an automatic warehouse, an unmanned truck for effecting the warehousing and delivering operations of the warehouse and transfer devices. As to the transfer of the machining tools, that automatic tool exchanging system has relationship with a tool managing subsystem which in turn is made coactive with such an automatic tool transfer control subsystem as to provide programs for controlling the automatic warehouse for transfer and storage of the tools, the unmanned truck, the tool exchanging robot and the NC machine. Next, the system under consideration will be described in detail with reference to the flow chart of FIG. 9. The computer judges in accordance with the machining schedule managing system and the tool managing subsystem whether or not it is necessary to switch the lots at the present time. In case it is necessary to switch the lots, the tools especially for the lots are delivered from the automatic warehouse in accordance with the lot number designated. If it is unnecessary to switch the lots, it is judged whether the tool being used is broken or used up. This judgement is made in accordance with the lighting of a red lamp which is disposed in the NC machine. In case the tool is broken, a permanent tool is delivered from the automatic warehouse. The tool thus delivered is carried on the unmanned (i.e., transfer) truck so that it is transferred to the machining tool. This machining tool is driven in accordance with an NC cutting tape, which is stored with signals concerning whether it is possible or not to exchange the tool in accordance with the cutting information. In the case of the exchanging system of FIG. 4, the tool exchange is based upon the condition under which the tool column is stopped. The NC cutting tape is stored with the information concerning the capability of the tool exchange, accompanying the workpiece exchange command step or the tool exchange step between the column and the spindle center. This is handled as a set or reset signal of a predetermined flag in the computer. If the capable state of the tool exchange is confirmed, a tool exchanging command for demanding the operations of the tool exchanging robot, the tool column and so on is produced to repeat the exchanging operations until all the tools designated are exchanged. After all the tools have been exchanged, the unmanned truck starts to carry and transfer the tool magazine to the automatic warehouse. In addition to the aforementioned steps, the place to which the tool exchange information is added corresponds to all the steps, at which an inequality of the cutting time for one tool (or step) is greater than the time necessary for the tool exchange is satisfied. As a result, generally speaking, the tool exchange is effected in the spare time during the machining operation so that the tool exchanging robot exchanges the tools during the machining operation of the NC machine while being interlocked with the automatic tool exchanger.

As has been described hereinbefore, the present invention makes it possible to exchange the tools with the tool magazine during the machining operation of the NC machine. As a result, it is unnecessary to stop the machining operation for the tool exchange so that the machining efficiency can be remarkably improved.

We claim:

1. In a tool exchanging system for a numerically controlled machining tool, in which a tool column, stored with tools to be fed to a spindle head of said numerically controlled machining tool, is adapted to move in accordance with the movement of said spindle head so as to maintain a fixed relationship between a first tool exchange position of said tool column and said spindle head whereat a first automatic tool exchange robot may exchange tools between said spindle head in said tool column, the improvement comprising:

a tool magazine, controllably positionable adjacent said tool column, said tool magazine transporting a complement of tools from a remote location;

means, cooperatively adapted to said tool column, for exchanging tools between the tool magazine and said tool column at a second tool exchange position in a manner allowing said spindle head to continue its machining operation motions during the tool exchange between said tool magazine and said tool column and for maintaining a fixed positional relationship between said tool magazine and the second tool exchange position of said tool column whenever said first automatic tool exchange robot exchanges tools between said tool column and said first tool exchange position.

2. An automatic tool exchanging system as claimed in claim 1, further comprising machining schedule managing means for controlling the sharing of the time for the machining process to enable automatic tool exchange between said tool magazine and said tool column to occur during periods when such exchange will not interrupt the machining operations of said numerically controlled machining tool.

3. In an numerically controlled machining tool, including a spindle head in which a tool is held to accomplish desired machining on a workpiece, said spindle head being adapted to move, relative to a main frame of said machining tool, in accordance with machining instructions provided by a numerical control system;

said numerically controlled machining tool further including a tool column storing a plurality of tools to be fed to said spindle head, and first tool exchange means for exchanging, at a first tool exchange position on the tool column, the tool held by said spindle head with a selectable one of the tools stored in said tool column, wherein said tool column is adapted so that said first tool exchange position moves in compliance with said spindle head;

the improvement comprising:

tool magazine means for storing a plurality of tools, said tool magazine means providing a source of tools stored in said tool column;

means for transferring said tool magazine means from a warehouse supply of tools to said numerically controlled machining tool;

second tool exchange means for transferring tools stored in said tool magazine means to said tool column; and means, cooperatively adapted to said tool column, for maintaining a fixed positional relationship between said tool magazine means and a second tool exchange position of said tool column whenever said first tool exchange position moves in compliance with said spindle head and for maintaining a fixed relationship between said spindle head and said first tool exchange position, whereat said second tool exchange means transfers tools from said tool magazine means to said tool column throughout all movement of said spindle head.

4. In a tool exchanging system for a numerically controlled machining tool, in which a tool column, stored with tools to be fed to a spindle head of said numerically controlled machining tool, is adapted to move in accordance with the movement of said spindle head so as to maintain a fixed relationship between a first tool exchange position of said tool column and said spindle head whereat a first automatic tool exchange robot may exchange tools between said spindle head in said tool column, the improvement comprising:

a tool magazine, controllably positionable adjacent said tool column, said tool magazine transporting a complement of tools from a remote location; and means for exchanging tools between the tool magazine and said tool column at a second tool exchange position in a manner allowing said spindle head to continue its machining operation motions during the tool exchange between said tool magazine and said tool column, wherein said tool column is constructed to have a roller chain carrying a plurality of tool boxes thereon, each tool box capable of containing one tool, said roller chain having a slack portion having a certain length governed in appropriate tension by an idler pulley which is relocatable in response to motions of said spindle head, said roller chain further having a rearmost pulley rotatably supporting the tool column on a pivot pin anchored to a rigid support external to said numerically controlled machining tool, said rear-most pulley establishing said second tool exchanging position at which said means for exchanging tools causes the tools to be exchanged between the tool magazine, placed at a position in proper proximity to said second tool exchange position, and said tool column.

5. An automatic tool exchanging system as claimed in claim 4, further comprising a tool exchanging robot attached to the tool magazine, wherein said tool magazine is carried on an unmanned transfer truck from an automatic warehouse external to said system and is placed from said transfer truck to said position in proper proximity to said second tool exchanging position whereat said tool exchanging robot exchanges the tools between said tool magazine and said tool column.

6. In a tool exchanging system for a numerically controlled machining tool, in which a tool column, stored with tools to be fed to a spindle head of said numerically controlled machining tool, is adapted to move in accordance with the movement of said spindle head so as to maintain a fixed relatioship between a first tool exchange position of said tool column and said spindle head whereat a first automatic tool exchange robot may exchange tools between said spindle head in said tool column, the improvement comprising:

a tool magazine controllably positionable adjacent said tool column, said tool magazine transporting a compliment of tools from a remote location; and means for exchanging tools between the tool magazine and the tool column at a second tool exchange position in a manner allowing said spindle head to continue its machining operation motions during the tool exchange between said tool magazine and said tool column, wherein said tool magazine includes a tool exchanging robot attached thereto, said robot being operably disposed to transfer the tools from said tool magazine to said tool column, and wherein said tool magazine is carried on an unmanned transfer truck from an automatic warehouse external to said system to a position whereat said tool magazine is transferred to a platform formed on the body of a tool magazine transfer device and then from the platform to a tool loading station rigidly affixed to and disposed at the side of the machining tool so that said tool loading station carrying said tool magazine, including said robot, moves with said machining tool in compliance with the movement of said spindle head, thereby maintaining said tool magazine in a constant positional relationship to said second tool exchanging position on said tool column.

7. In a numerically controlled machining tool, including a spindle head in which a tool is held to accomplish desired machining on a workpiece, said spindle head being adapted to move, relative to a main frame of said machining tool, in accordance with machining instructions provided by a numerical control system, said numerically controlled machining tool further including a tool column storing a plurality of tools to be fed to said spindle head, and first tool exchange means for exchanging, at a first tool exchange position, the tool held by said spindle head with a selectable one of the tools stored in said tool column, wherein said tool column is adapted so that said first tool exchange position moves in compliance with said spindle head;

the improvement comprising:

tool magazine means for storing a plurality of tools, said tool magazine means providing a source of tools stored in said tool column;

means for transferring said tool magazine means from a warehouse supply of tools to said numerically controlled machining tool, said means for transferring said tool magazine means comprising a numerically controlled transfer truck operating along at least programmably selected path defined between said warehouse and said numerically controlled machine tool, said transfer truck further comprising:

means for positively positioning said tool magazine means carried thereon;

a platform capable of supporting said tool magazine in a positively positioned manner at said second tool exchange position;

means for positively positioning said transfer truck into a fixed positional relationship with said platform; and means for transferring said tool magazine means from said truck to said platform;

whereby said transfer truck may be controlled to perform other transfer functions of tool magazines and workpieces while the tools are being transferred by said second means for transferring tools from said tool magazine means to said tool column;

second tool exchange means for transferring tools stored in said tool magazine means to said column; and means, cooperatively adapted to a said tool column, for maintaining a fixed positional relationship between said tool magazine means and a second tool exchange position of said tool column whereat said second tool exchange means transfers tools from said tool magazine means to said tool column throughout of all movement of said spindle head.

8. The improvement in a numerically controlled machining tool as claimed in claim 7, further comprising:

a tool magazine means support structure rigidly affixed to said numerically controlled machining tool in a manner so as to enable said support structure to move in compliance with its spindle head; and means for transferring said tool magazine means from said platform to said support structure.

* * * * *